(No Model.) 4 Sheets—Sheet 4.

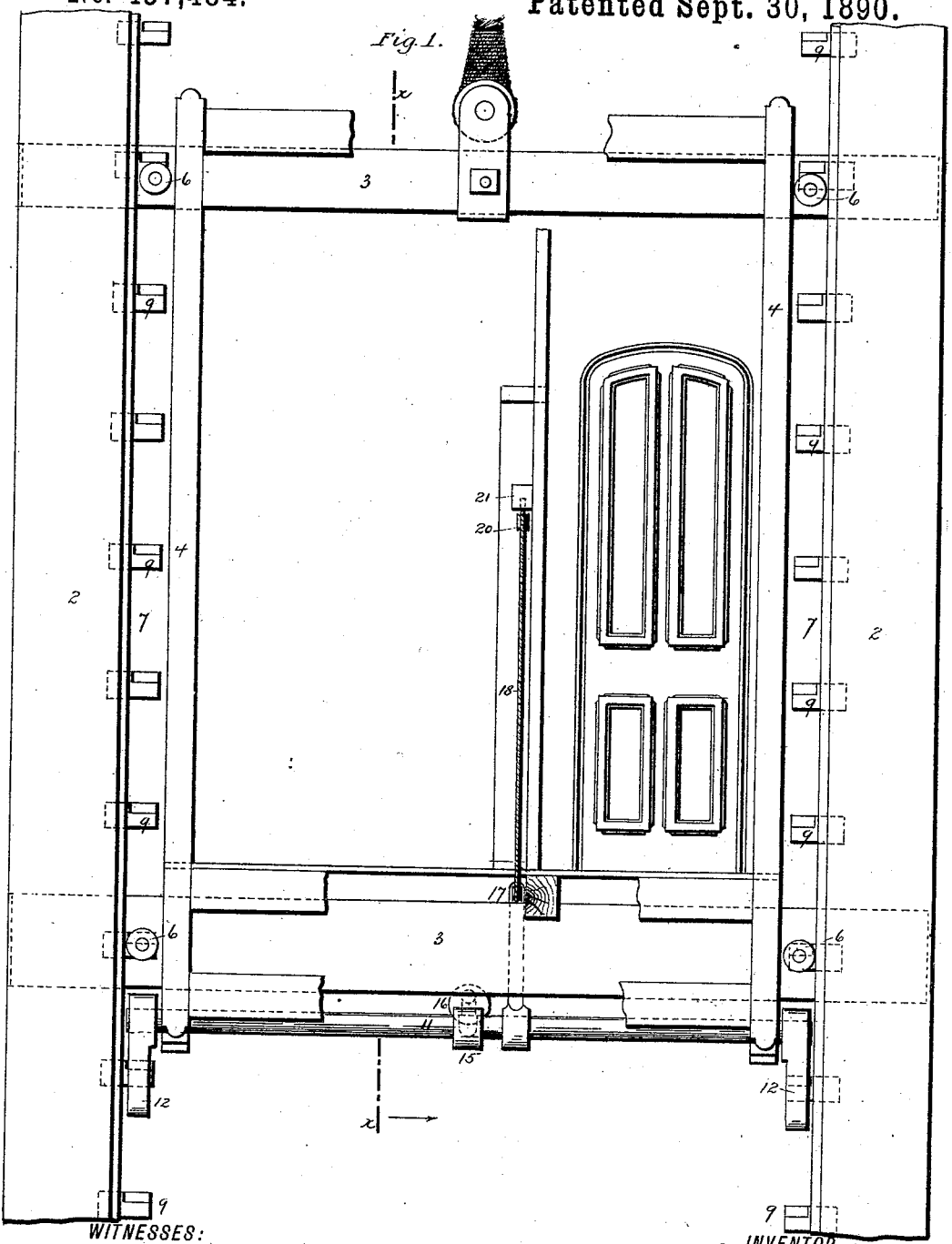

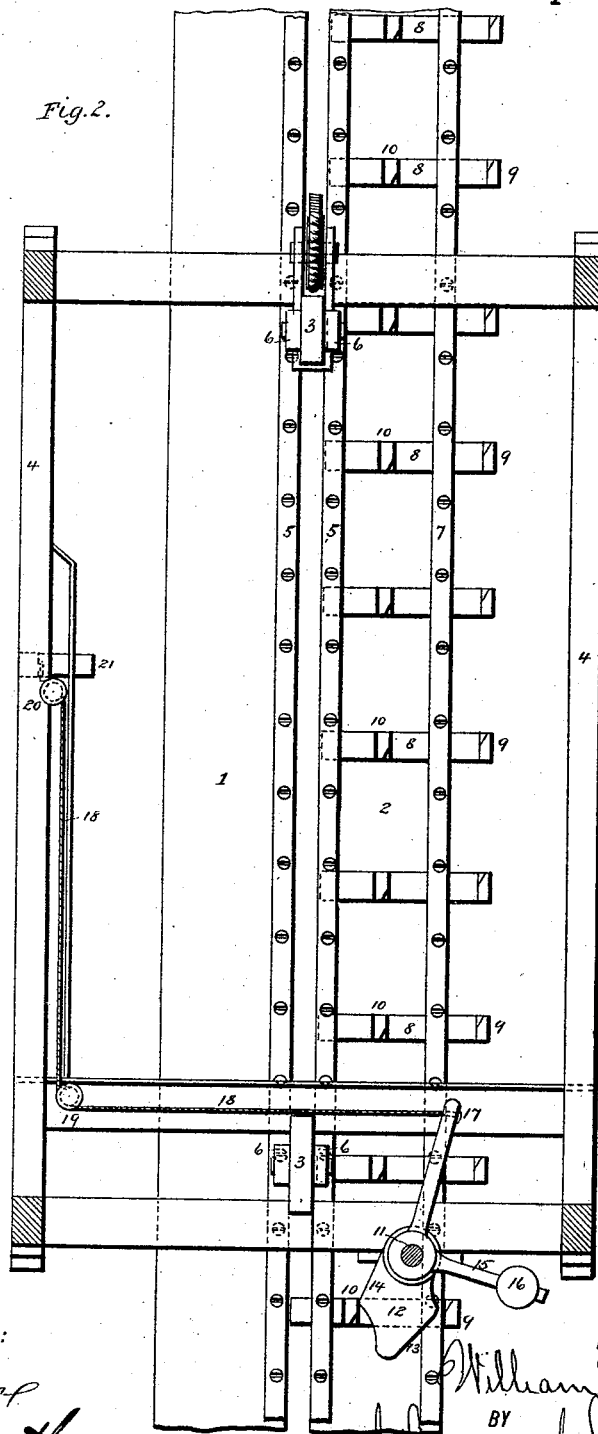

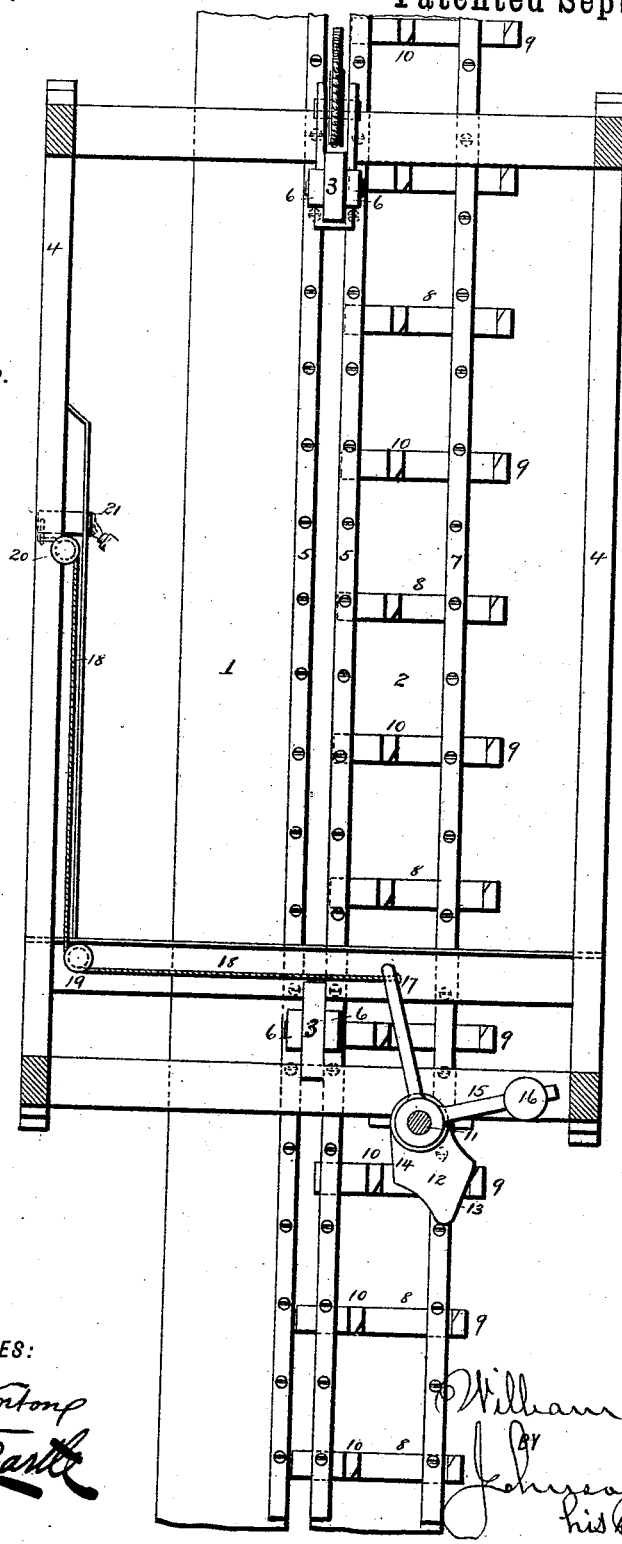

W. DEERING.
SAFETY DEVICE FOR ELEVATORS.

No. 437,484. Patented Sept. 30, 1890.

WITNESSES: INVENTOR
William Deering
BY
Johnson & Johnson
his ATTORNEYS.

UNITED STATES PATENT OFFICE.

WILLIAM DEERING, OF LOUISVILLE, KENTUCKY.

SAFETY DEVICE FOR ELEVATORS.

SPECIFICATION forming part of Letters Patent No. 437,484, dated September 30, 1890.

Application filed January 13, 1890. Serial No. 336,820. (No model.)

*To all whom it may concern:*

Be it known that I, WILLIAM DEERING, a citizen of the United States, residing at Louisville, in the county of Jefferson and State of Kentucky, have invented new and useful Improvements in Safety Devices for Elevators, of which the following is a specification.

My invention is directed to improvements in that class of elevators which ascend and descend through a series of movable bolts, bars, or stops fitted to slide on hatchway-studs extending from the bottom to the top on the two opposite sides of the elevator-shaft. These bolts are placed at intervals of about twelve inches apart, and by my improvements of novel devices and combinations of devices are made to project out underneath the elevator-coach when it is ascending and are drawn in again out of its passage-way when it is descending.

Figure 5:
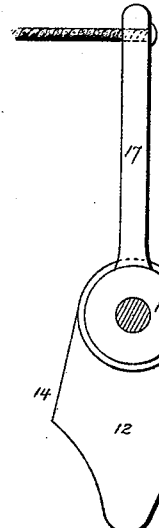
Figure 4:
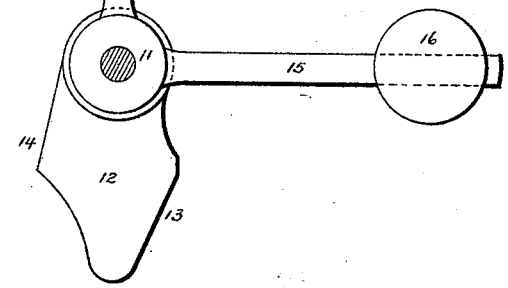
Figure 6:
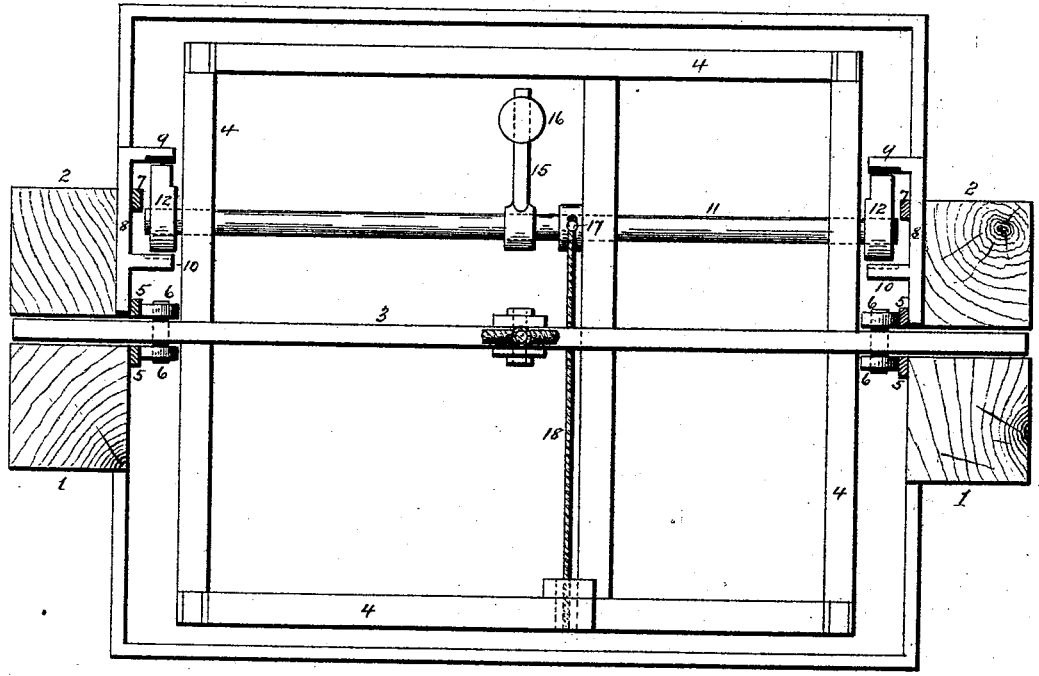

My invention is particularly directed to a certain new and useful mode of moving these bolts outward and inward, as in this class of elevators is always necessary, and which I will now proceed to describe in connection with the accompanying drawings, which illustrate the mechanism upon which the said mode is based, and which is explained as follows:

Figure 1 shows in elevation a portion of an elevator-shaft and of a cage therein, with certain of its frame parts broken away. Fig. 2 shows a vertical section taken on the line $x\,x$ of Fig. 1, the side of the cage being shown removed and the safety controlling devices in the positions they occupy when the cage is ascending. Fig. 3 is a similar sectional view, the safety controlling devices being in the position they occupy when the cage is descending. Fig. 4 is a horizontal section of the hatchway structure, showing the cage in skeleton view and the relation thereto of the safety devices. Fig. 5 shows in side view one of the dual cam devices for moving the bolts in and out as the cage may be descending or ascending, and Fig. 6 shows in a top view one of the sliding bolts or safety-stops.

The hatchway structure is erected upon and between four studs 1 1 and 2 2, which extend from the foundation to the desired height in pairs, each pair standing apart sufficiently to allow the projecting ends of guide-beams 3, with which the cage 4 is constructed, to pass up and down between them. These guide-beams are of wrought-iron and are preferably centrally fixed across the cage at its top and at its bottom and project beyond the opposite side of the cage to form its guides between the studs.

Along the inner faces of the studs and at the inner adjacent edges thereof are fastened wrought-iron strips or plates 5, which serve to protect the studs from abrasion by the guide-beams 3 and as tramways for friction-rolls 6, mounted on each side of the said beams to keep the latter and the cage built upon them from vibration sidewise.

At the outer corner on the inner face of the studs 2 is fastened a wrought-iron strip or plate 7, which, in connection with the corresponding plate or strip 5 at the inner corner of said stud, forms casements, which serve to confine the safety-bolts 8 placed upon said studs. These bolts 8, however, may be boxed or mortised into the studs in any suitable way that will permit of their being moved across the space between the studs, as I will presently describe. These bolts are made of wrought-iron or steel an inch or more thick and two inches or more in width. At its outer end each bolt is provided with a right-angled arm 9, and near its other end an arm 10, of equal length and standing in the same direction as arm 9, the said arms having a width preferably equal to that of the bolts. These bolts are arranged in horizontal parallel relation about twelve inches apart upon each of the studs 2, so that they will stand in acting pairs—meaning by "pairs" that any bolt on one stud and its fellow bolt on the other stud on the same horizontal plane will be projected out across the space between the studs and be made to move back pair by pair out of that space the instant the lower cage guide-beam passes any pair of them as it ascends or descends. In this operation the arm 10 is that through which the bolt is pushed out across the space between the studs, and the arm 9 is that through which the bolt is drawn back out of that space and into its casement.

Devices whereby a pushing of these bolts is effected through these arms thus out and in are provided as follows: A wrought-iron rock-shaft 11 is secured in suspension-boxes to the under side of the cage-frame, so as to stand horizontally between the studs, and is provided at each end with a fixed dual or double edged cam 12, both of like construction and both standing radially from the shaft in the same direction, as seen in Fig. 1. These cams stand contiguous to the inner faces of the studs 2 and in planes vertically coincident with the space between the arms of the bolts, as seen in Fig. 4, so that one of the dual sides of the cam is brought into contact with a bolt-arm when the cage is ascending and the other side of the said dual cam is brought in similar contact with the bolt-arm when the cage is descending. For this purpose the acting faces of the dual cams are so formed as to cause one face 14 to thrust the bolt by its pressure on the arm-cam out across the path of the ends of the lower guide-beam 3 when the cage is ascending, while when the cage is descending the other cam-face 13 acts by its pressure on the arm 9 to push the bolt out of this guide-beam's path. This pushing is instituted, primarily, by the motion of the cage, and, secondarily, as follows: first, by a device which automatically thrusts and keeps the cams 14 against the arms 10 of the bolts, and, second, by a device for drawing this cam away from this arm and thrusting and keeping the cams 13 against the arms 9 of the bolts, and which second device, it will be understood, is both primarily and practically inactive and inoperative until subjected to an application of pressure of the hand originating in the perception and judgment of the conductor.

The devices which automatically put and keep the cams 14 against the arms 10 of the bolts when the cage is ascending are as follows: To the rock-shaft 11, and at any point that may be selected between the said separate cams, is keyed the arm 15, so as to stand horizontally, and having a counter-weight 16 at its outer end, which constantly tends to and does rock the shaft in the direction of said arm, and by its gravity thrusts the separate cams 14 against the bolt-arms 10 with pressure sufficient to push and keep the bolts 8 across the space between the studs when the cage is ascending.

The devices which through the hand of the conductor put and keep the separate cams 13 against the bolt-arms 9 are as follows: To the rock-shaft 11, and at any point suitable for an application of that hand, is keyed the arm 17, so as to stand upward, and to which is attached a cord—silk, catgut, or fine wire—18, which being changed from its direction horizontally into a direction vertically over a pulley 19, secured in the cage, passes up over a pulley 20 into a horizontal direction, and is connected to the inner end of a hand treadle or pusher 21, subject to the hand of the conductor and placed conveniently in the vertical wall of the cage. This hand treadle or pusher is of a length suited to the throw of the bolts and is suitably incased in the wall of the cage, so as to limit its free or outward movement. When the cage is ascending, the counter-weight by its gravity, in conjunction with the motion of the cage, pushes the bolts out across the path of the cage-beam, yet at the same time, as is evident, keeps the arm 15 in the position inclining downward, as in Fig. 2, and so pulls and keeps the hand treadle or pusher 21 projected out into the cage. As this pushing of the bolts is purely automatic, the conductor has, as is evident, no duty in hand other than as ordinary.

Having reached any point from which it is his duty to descend, the conductor lays his right hand on the face of the hand treadle or pusher 21, and, pushing from him, he not only overcomes the gravity of the counter-weight 16, but also supplies what may be called a "counter" counter-weight, which carries the separate cams 13 against the arms 9 of the bolts, and so pushes these bolts, pair after pair, back out of the path of the cage-beam into their casements, else any descent farther than the few inches that only at any time can be between his cage and the pair of bolts next immediately underneath it would be impossible. The conductor having by his right hand pushed and held the hand treadle or pusher outward from the cage, he grasps with his left hand the cord as in all elevators enables him to reverse the direction of its motion, and institutes that reversion. Then continuing the pressure of his right hand, descends, the same as though there were no such firmly-based bolts acting as a bar to his advance. If at any moment the conductor removes his hand by volition, or if by any intervention it be removed, at that instant the automatically-acting counter-weight 16 is released and immediately the cams 13 withdraw from the arms 9 of the bolts, and there being nothing then to draw back those bolts, the cage can descend but through the few inches which may at the moment be between its floor-beam and the pair of bolts at that moment next below it. On reaching any floor in descending on which the conductor has to land passengers, he removes, or at least slackens, the pressure of his hand upon the hand treadle or pusher. Such slackening or removal of such pressure would of course be by volition. A removal of such pressure by intervention means any shock or jostle which suddenly breaks the continuity of such pressure, and by this breaking allows the counter-weight 16 to withdraw the cams 13 from the arms 9 of the bolt, and there being nothing to effect a withdrawal of the bolts back into their casements, these bolts then present themselves as bars against any farther descent, exactly the same as in the cases of the removal of the hand by volition. An impulsion given to the cage by any transfer of this motion governed by artifices to a motion governed solely by gravitation imparts such a shock or jostle. As any sudden breaking of ropes or any devices governing the motion of an elevator introduces such a transfer, it follows that any such breaking involuntarily interrupts the pressure of the hand against the hand treadle or pusher, and this pressure being thus interrupted any such breaking can be followed by nothing more serious than a falling of the cage through a few inches, as stated.

For this counter counter-weight I do not, however, confine myself to an application of the hand to what I have described and shown as the hand treadle or pusher, as there are other modes by which the hand of the conductor can make itself this counter counter-weight. In my careful experiment in this matter I supplied a handle to be grasped by the hand and pulled upward, in another case to be pulled downward, and in a third case to be pushed or pulled like the handle of a steering-wheel of a ship; but none of these proved as satisfactory as the device herein adopted. With the muscles of the hand grasping a handle I found that the shock given by the falling to which I subjected my coach forces these muscles into a momentary greater contraction, while with the open hand upon the end of the hand treadle or pusher any such a contraction lessens the pressure of its muscles against the said hand-treadle, and is therefore in favor of the desired instantaneous release and action of the automatic counter-weight.

As the cams move vertically between the arms of the bolts at both sides of the cage, the width between the dual cam-faces must be less than the distance between the arms of the bolts, and in order that there shall be no danger of the sudden striking of the cams upon the bolt-arms as the dual cam rises or descends I bevel the facing or inner sides of said arms, respectively, from above and from below, and it is upon these bevel-faces that the dual cams act with a free and smooth pushing action to slide the bolts, as stated.

From the foregoing it will be understood that in the descending movement of the elevator-cage the sliding bolts above the beams are left in positions out of the path of the elevator-beams, while upon the ascent of the elevator-cage these sliding bolts below the beams are left in positions crossing the path of the lower elevator-beam, and that such positions of the bolts are effected simultaneously in pairs by the action of what I call "double-edged fore and back" cams, which are rendered active to slide and hold the bolts in one direction by the hand of the conductor and to slide and hold the bolts in the other direction by a counter-weight having sufficient force for the purpose. In this action the separate cams are vibrated through an arc equal to the throw of the bolts, the extent of which in the example shown is determined in one direction by the extent of the outward free movement of the hand-treadle or pusher and in the other direction by the abutting action of the end arms of the bolts against the casing, within which the bolt is fitted and confined, so that their outer faces are flush with the sides of the studs, as shown in Fig. 4.

While I prefer to construct the cage with a floor guide-beam projecting at its ends, as described, yet iron sections may in some cases be bolted to side beams constituting part of the frame-work of the floor of the cage, such iron sections having arms which project and move in the space between the studs as the ends of the beams do.

While the cord-connection of the hand-pusher device with the rock-shaft is preferred, yet I have used rigid devices for connecting the hand of the conductor to said shaft instead of the cords, and I therefore do not limit myself to such cord-connection.

I claim as my invention—

1. In a safety device for elevators, the combination, with bolts arranged to slide upon hatchway-studs in the path of the elevator-cage and cams for sliding said bolts arranged upon the cage, of a counterpoise connected to automatically operate said cams, and a hand-controlled device connected to said cams to act in opposition to said counterpoise, substantially as described, for the purpose stated.

2. In a safety device for elevators, the combination, with bolts arranged to slide upon hatchway-studs in the path of the elevator-cage, and cams upon the cage for operating said bolts, of a counterpoise connected to automatically operate cams, a hand treadle or pusher device in said cage, and a cord for connecting said hand-treadle and cams, substantially as described, for the purpose stated.

3. In a safety device for elevators, the combination, with a series of sliding bolts upon the hatchway-studs, having side arms and arranged in vertical series in the path of the elevator-cage, of a shaft journaled upon said cage, having dual or double edged cams for alternately engaging said bolt-arms, a counterpoise upon said shaft, an arm 17 upon said shaft, and means controlled by the hand of the conductor for operating said arm in opposition to the counterpoise, substantially as described, for the purpose stated.

4. In a safety device for elevators, the combination, with the cage, of cams carried thereby, each formed with double-acting cam parts, bolts arranged to slide upon the hatchway-studs, having arms arranged to embrace said dual cams, and suitable mechanism for rocking said dual cams to operate said bolts in the way described.

5. The elevator-cage having projections on its opposite sides, a horizontal rock-shaft having a cam depending from each end, formed each with two cam-faces, a counterpoise-arm extending from said shaft to rock said shaft in one direction, and a cord-controlled arm to rock said shaft in an opposite direction, in combination with bolts arranged to slide upon the hatchway-studs, each provided with a pair of arms, between which the said dual cams stand to operate said bolts on the ascent and on the descent of the cage, as described.

6. A safety device for elevators, consisting of a rock-shaft 11, mounted in the cage and having a dual or double edged cam 12 on each end, bolts 8 fitted upon the hatchway-studs to slide into and out of the path of the elevator, and provided with arms 9 10, adapted to engage said dual cams, and means for rocking said shaft to vibrate its cams, consisting of a counter-weight on said shaft, and a hand treadle or pusher device having a cord-connection with said shaft, substantially as described.

7. In a safety device for elevators, the combination, with bolts arranged to slide upon fixed parts on the opposite sides of the hatchway structures, of a cage having projections arranged on its opposite sides across the path of which said bolts are moved, suitable cams arranged on said cage for operating said bolts, and a hand treadle or pusher device in said cage having a suitable connection with said cams, substantially as described, for the purpose specified.

8. In a safety device for elevators, the cage provided with the top and with the bottom beams, each provided with rolls on its opposite sides, and a bottom rock-shaft having a dual-formed cam on each end, in combination with hatchway-studs between which said beams move and upon which said rolls travel, and bolts arranged to slide upon said studs, each having an arm arranged to receive the action of one of said cams on the ascent of the cage and an arm arranged to receive the action of the other cam on the descent of the cage, substantially as described.

In testimony whereof I have hereunto set my hand in the presence of two subscribing witnesses.

WILLIAM DEERING.

Witnesses:
WILLIAM LOTZ,
MARY C. REXTER.